United States Patent

[11] 3,624,537

[72] Inventor John Matarese
New City, N.Y.
[21] Appl. No. 839,327
[22] Filed July 7, 1969
[45] Patented Nov. 30, 1971
[73] Assignee GTE Laboratories Incorporated

[54] GYRATOR NETWORK
6 Claims, 5 Drawing Figs.

[52] U.S. Cl. .................................................. 330/63, 330/30 D, 333/14.1
[51] Int. Cl. .................................................. H04f 9/00
[50] Field of Search ......................................... 330/63, 109, 85, 30 D; 333/80 T, 80, 24.1

[56] References Cited
UNITED STATES PATENTS

| | | | |
|---|---|---|---|
| 3,001,157 | 9/1961 | Sipres et al. .................. | 333/24.1 X |
| 3,255,364 | 6/1966 | Warner, Jr. .................... | 307/304 |
| 3,300,738 | 1/1967 | Schlicke ........................ | 333/24.1 |
| 3,361,981 | 1/1968 | Wolcott ......................... | 330/69 X |
| 3,400,335 | 9/1968 | Orchard et al. ................ | 330/24 |
| 3,456,128 | 7/1969 | Myers ........................... | 330/30 X |

*Primary Examiner*—Nathan Kaufman
*Attorney*—Irving M. Kriegsman

ABSTRACT: A gyrator network having a pair of oppositely phased voltage-to-current converters connected between two ports. Unlike prior art networks, each voltage-to-current converter is a single-stage circuit, namely, a difference amplifier in which the output resistor is replaced by a constant current source. This has the effect of producing a current change in a load connected to the output of the difference amplifier, which current change is proportional to a change in the input voltage. The resulting gyrator network has reduced power dissipation requirements.

INVENTOR.
JOHN MATARESE
BY
Amster & Rothstein
ATTORNEYS

INVENTOR.
JOHN MATARESE
BY Austen & Rotenstein
ATTORNEYS

GYRATOR NETWORK

This invention relates to gyrator networks and more particularly to a gyrator having two voltage-to-current converters each of which is a single-stage circuit.

The gyrator is a nonreciprocal two-port network with an admittance matrix $$\begin{bmatrix} 0 & g_1 \\ -g_2 & 0 \end{bmatrix}$$

where $g_1$ and $g_2$ are the gyrator transconductances. The gyrator has the property that an admittance $y$ connected to one port is transformed into an impedance $y/g_1g_2$ presented at the other port; consequently, a capacitance C can be transformed into an inductance $L=C/g_1g_2$.

A two-port network having the admittance matrix of a gyrator can be implemented with the use of two voltage-to-current converters. Each port has two input terminals; typically, one terminal of each port is grounded. A first converter is connected in one direction between the remaining two terminals, one in each port, and the second converter is connected between the same two terminals but in the opposite direction. The two converters have respective phase shifts of 0° and 180°. For the two voltage-to-current converters to provide satisfactory gyrator characteristics, each converter should have very large input and output impedances.

In typical prior art gyrator networks, each voltage-to-current converter consists of a number of stages. Typical of multistage type converters are those shown in my copending applications Ser. No. 839,036 and 830,221, filed respectively on July 7, 1969 and July 7, 1969. Each voltage-to-current converter includes a difference amplifier stage at the input. (The difference amplifier includes Darlington circuits for providing a high input impedance to the connected port.) The output of the voltage-to-current converter consists of a complementary pair of transistors for converting a voltage signal to a current signal. Connecting the output of the difference amplifier and the input of the complementary pair is another stage, which stage in the networks disclosed in my copending applications serves to shift the DC level of the difference amplifier output to the DC level of the complementary pair input.

It is a general object of the present invention to provide a gyrator network in which each voltage-to-current converter consists of only a single stage, namely, a modified difference amplifier.

The advantages of a reduced number of stages in each voltage-to-current converter are obvious; in addition to a decreased number of both active and passive components, the power dissipation requirements of the network are reduced. Also, the gyrator transconductances are determined simply by the effective transconductances of the two modified difference amplifiers. An ordinary difference amplifier, however, cannot be used for the stated purpose because the output of such a difference amplifier is a voltage (proportional to the difference between the two input voltages), not a current. In a typical prior art voltage-to-current converter utilized in a gyrator, one of the two inputs of the difference amplifier is grounded and the other is coupled to one of the two ports of the system. The output of the difference amplifier is thus simply a voltage which is proportional to the voltage at the respective port. One or more additional stages are required to actually convert the difference amplifier output voltage to a current which is delivered to the other port of the gyrator. (In the gyrators disclosed in my above-identified copending applications, the second difference amplifier input in each voltage-to-current converter is not grounded but instead is connected to an output of the difference amplifier so that the difference amplifier includes feedback. While this feedback improves the performance of the gyrator, the output of the difference amplifier is still a voltage signal and additional stages are required to convert it to a current.)

In accordance with the principles of the present invention, each voltage-to-current converter incorporates a modified difference amplifier. In a conventional difference amplifier, a pair of transistors is provided, at least one of whose collectors is returned through a resistor to a potential source. The two inputs to the difference amplifier are applied to the two base terminals. The voltage developed across the collector resistance is proportional to the difference between the two base voltages. In the gyrator of my invention, however, the collector resistance is replaced by a constant current source. The collector of the transistor whose output circuit includes this constant current source is connected directly to the gyrator port whose current is to be determined by the voltage at the other port which is coupled to the difference amplifier input. It will be shown below that replacing the collector resistance of a difference amplifier by a constant current source results in a difference amplifier whose output current changes in accordance with changes in the input voltage, i.e., a single-stage voltage-to-current converter suitable for use in a gyrator.

It is a feature of my invention to replace the collector resistance in a difference amplifier by a constant current source to produce a voltage-to-current converter.

It is another feature of my invention to connect two such voltage-to-current converters (of opposite phases) in opposite directions between the two ports of a gyrator network.

Further objects, features and advantages of my invention will become apparent upon a consideration of the following detailed description in conjunction with the drawing, in which.

Figure 1:
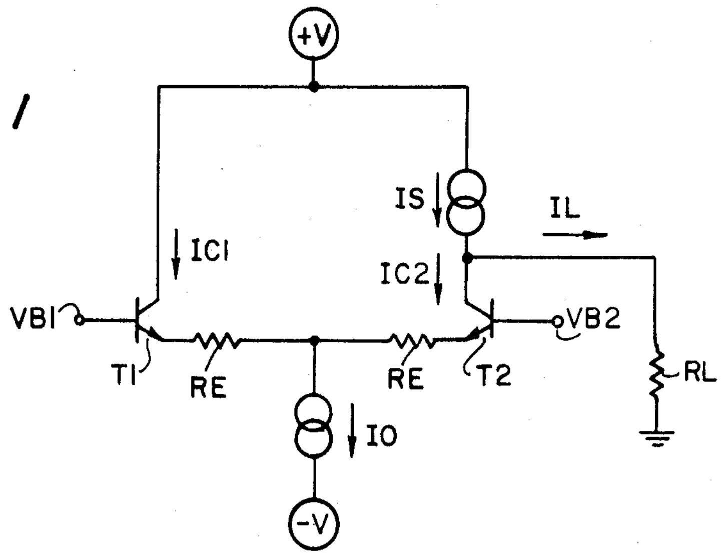
FIG. 1 depicts an illustrative modified difference amplifier in accordance with the principles of my invention.

The circuit of FIG. 1 is a standard difference amplifier except that the conventional collector resistance of transistor T2 has been replaced by a constant current source IS. Consider for the moment that resistor RL is omitted from the circuit and that current source IS is replaced by a resistor. Assume further that initially both of the two input terminals VB1 and VB2 are at ground potential. In such a case, the constant current delivered by source IO divides equally between transistors T1, T2 and the two emitter resistances RE. The quiescent voltage at the collector of transistor T2 is determined by the voltage drop across the collector resistance. Difference amplifiers are usually made in a symmetrical configuration and it might be expected that a collector resistance would also be provided for transistor T1. It is not necessary to do so, however, because the collector resistances do not affect the symmetry of operation. A collector resistance is only necessary to develop an output voltage.

Assume now that voltage VB1 at the similarly designated terminal increases relative to the voltage VB2. In such a case, transistor T1 is more forward biased than transistor T2 and a greater current flows through transistor T1. Initially, the two transistor currents IC1 and IC2 are equal, each being half of the total current IO. However, if the voltage at the base of transistor T1 increases relative to the voltage at the base of transistor T2, the current division is not equal and IC1 exceeds IC2. Similarly, if voltage VB2 exceeds VB1, the current IC2 exceeds IC1. With a resistor in the collector circuit of transistor T2, changes in current IC2 result in a changing collector voltage. This voltage, the output of the difference amplifier, is proportional to the difference between voltages VB1 and VB2, and its polarity relative to the quiescent level depends upon which of the two input voltages exceeds the other.

Figure 2:
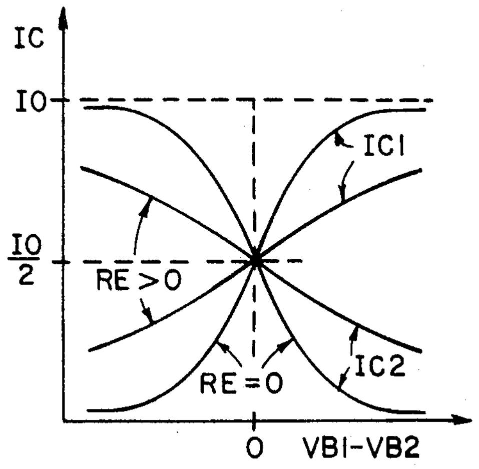
FIGS. 2 and 3 depict the characteristics of the circuit of FIG. 1 as a function of the two emitter resistances RE.
Figure 3:
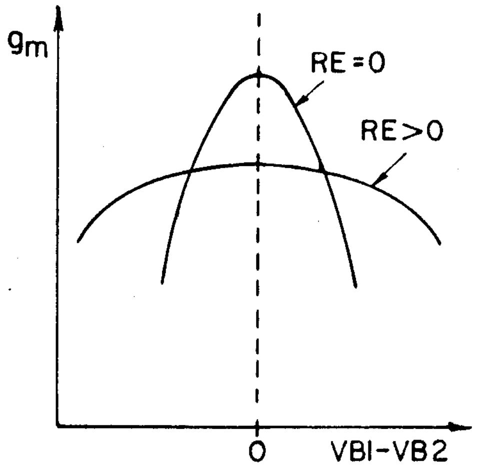

The effect of the two emitter resistances RE can be best understood with reference to FIGS. 2 and 3. FIG. 2 is a plot of collector current (either IC1 or IC2) as a function of the difference between the two input voltages, VB1–VB2. Two curves are shown for IC1 and two curves are shown for IC2. Consider first the two curves for which the emitter resistances RE are zero. The two curves intersect at a point where the difference voltage input is zero and both collector currents equal to the value IO/2. With two equal input voltages, each of transistors T1,T2 conducts half of the total current IO. Assume that voltage VB1 starts to increase relative to voltage VB2. If the curve for current IC1 is followed (moving to the right for an increasing horizontal coordinate), it is seen that the current increases. This is due to the fact that transistor T1 conducts more heavily than transistor T2. At the same time, it is seen that current IC2 starts to decrease. For any value of VB1—VB2, the sum of currents IC1 and IC2 is equal to the value IO. It is also seen that as the difference VB1–VB2 becomes relatively large transistor T2 tends to cease conducting and the total current IO flows through transistor T1. Similarly, if the voltage VB2 starts to increase relative to the voltage VB1, it is seen (moving to the left of the zero coordinate on the horizontal axis) that current T2 tends to approach the value IO and transistor T1 approaches cutoff. The two curves are symmetrical about the two lines VB1–VB2=0 and IC=IO/2.

With emitter resistances in the circuit, each of transistors T1,T2 has the configuration of an emitter follower. The overall circuit operation is stabilized as a result of the emitter degeneration. For any input voltage difference, there is less of a change in the two currents IC1, IC2. This is reflected by the two curves in FIG. 2 for the case where RE is greater than zero. The greater the value of the emitter resistances, the closer are the two curves to the line IC=IO/2. Again, the two curves are symmetrical about this line and the line VB1–VB2=0.

The reason for providing emitter degeneration becomes apparent with reference to FIG. 3. The horizontal coordinate once again represents the difference between the two input voltages. The vertical axis represents the overall transconductance ($g_m$) of the amplifier, that is, the change in IC2 for any incremental change in input voltage difference. As is known in the art, $g_m$ is not constant and instead varies with the input voltage difference. With no emitter resistances (RE=0), the $g_m$ curve is symmetrical about the line VB1—VB2=0. With emitter resistances, the curve is also symmetrical about this line. However, the curve has a lower peak value and exhibits less of a change from the peak value than the curve for RE=0 for the same change in input voltage difference. Thus, the operation of the difference amplifier is more linear but its peak $g_m$ is reduced. In effect, there is a trade-off between gain and the range of linear operation.

Referring back to FIG. 1, the difference amplifier of my invention is provided with constant current source IS in the collector circuit of transistor T2. Furthermore, a load resistance RL is connected between ground and the collector of transistor T2. A load current IL is shown flowing through load resistance RL in the direction which in this description is defined to be "positive."

It is apparent that IS=IL+IC2 since the current from constant current source IS divides between the load resistance and transistor T2. Any variation in IC2 as a result of a signal change in VB1—VB2 must necessarily be compensated by a corresponding change in IL. That is, if IC2 increases, IL must decrease by the same amount (in the case of an IL=0 quiescent condition, the load current flows in the reverse "-negative" direction); and if IC2 decreases, IL must increase by the same amount. Since changes in IC2 are related to the signal VB1 VB2 by the transconductance ($g_m$) of the difference amplifier, it is apparent that changes in IL are similarly related to the difference VB1—VB2 by the same factor. The difference amplifier functions to control current changes through the load in direct proportion to the voltage difference VB1—VB2.

If the base of transistor T2 is grounded, changes in IL are directly proportional to changes in VB1. If VB1 increases, IL increases in the positive direction (because IC2 decreases); and if VB1 decreases, IL increases in the negative direction (because IC2 increases). Conversely, if the base of transistor T1 is grounded, an increase in VB2 results in an increase in IL in the negative direction, and a decrease in VB2 results in an increase in IL in the positive direction. In both cases, the difference amplifier functions as a voltage-to-current converter. The polarity of the change in the load current relative to a change in the voltage at the ungrounded base terminal depends upon which of the two base terminals is coupled to the input voltage. It is apparent that the opposite phases required of the two voltage-to-current converters in a gyrator can be obtained by applying the input voltage to a different one of terminals VB1, VB2 in each converter.

The current and transconductance curves of FIGS. 2 and 3 apply to the circuit of FIG. 1, as well as to a conventional difference amplifier having a resistance instead of a constant current source in the collector circuit of transistor T2. Changes in load current as a function of input voltage are determined by the transconductance of the difference amplifier, which transconductance may be decreased by the addition of emitter degeneration resistors RE. The emitter degeneration increases the linearity of the transfer characteristic (FIG. 2) and the transconductance curve (FIG. 3). It should also be noted that the transconductance can be changed simply by varying the magnitude of RE. When two of the circuits of FIG. 1 are used in a gyrator, as will be described below, each of the gyrator transconductances can be varied simply by varying the two resistors RE in each of the voltage-to-current converters. (Any increase in transconductance values, however, is accompanied by a smaller range of linear operation.)

Figure 4:
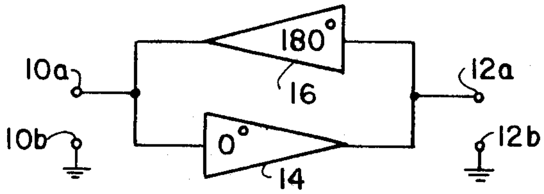
FIG. 4 is a block diagram of a basic gyrator system.
Figure 5:
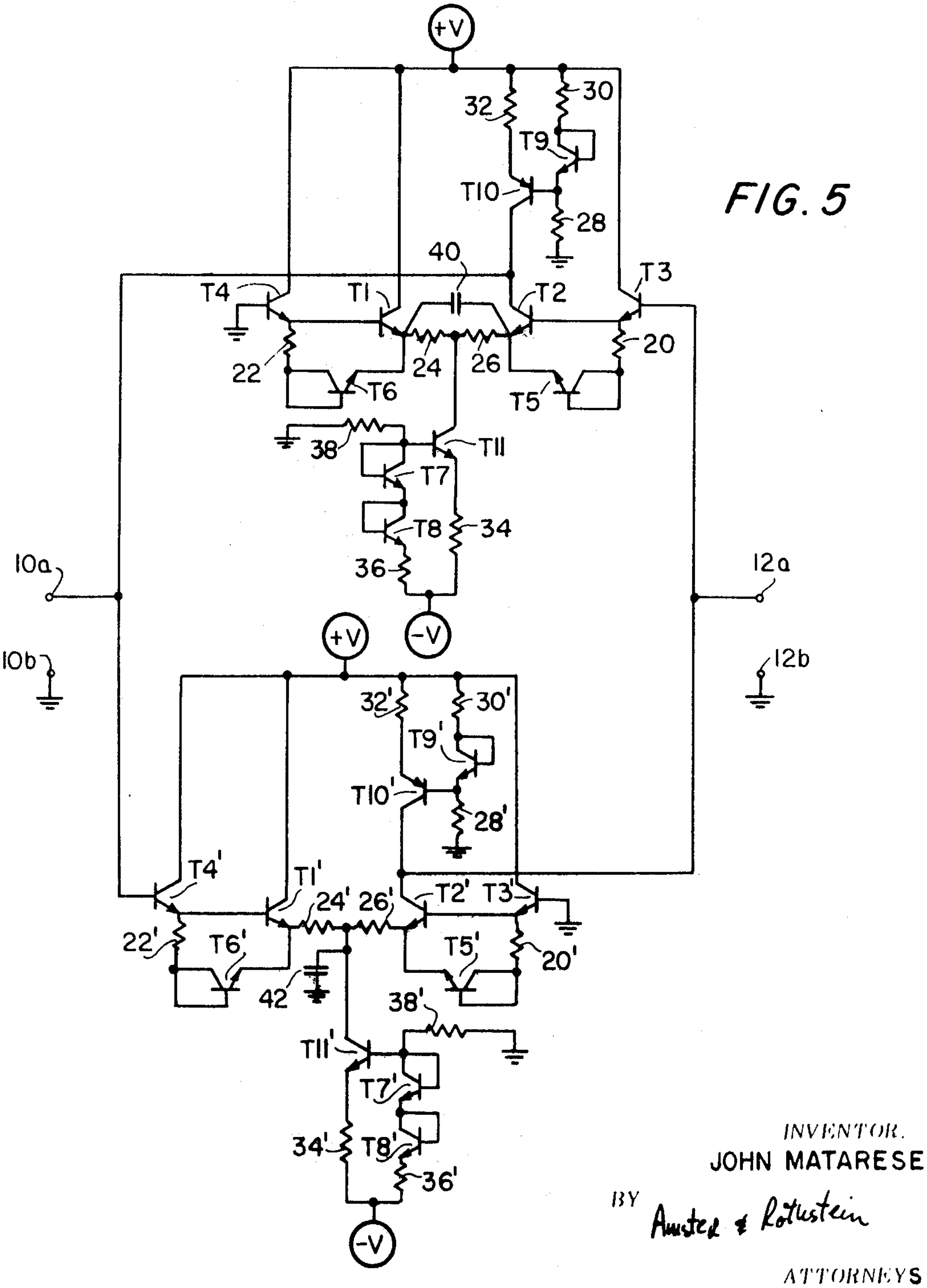
FIG. 5 is an illustrative gyrator network designed in accordance with the principles of my invention.

Before proceeding with a detailed description of the circuit of FIG. 5, it will be helpful to review the basic gyrator system depicted in FIG. 4. The system includes two ports, one having terminals 10*a*, 10*b*, and the other having terminals 12*a*, 12*b*. Terminals 10*b*, 12*b* are grounded. Between terminals 10*a*, 12*a* are two oppositely phased voltage-to-current converters 14, 16 having transconductances equal to $g_1$ and $g_2$ respectively connected in parallel in opposite directions. It can be shown that if a capacitance C is placed across terminals 12*a*, 12*b* (the output port), then the impedance seen looking into terminals 10*a*, 10*b* (the input port) is an inductance of value $C/g_1g_2$.

The uppermost voltage-to-current converter 16 is shown as having a phase shift of 180°. This is interpreted as follows: If terminal 12*a* goes positive with respect to terminal 12*b*, then increased current flows in the direction from terminal 10*b* to terminal 10*a*. (This would have the effect, were a resistor placed across terminals 10*a*, 10*b*, of causing terminal 10*a* to go negative with respect to terminal 10*b* -- a phase shift of 180° relative to the initial voltage change across terminals 12*a*, 12*b*.) The 0° phase shift of converter 14 is interpreted in the converse manner: If terminal 10*a* goes positive with respect to terminal 10*b*, then current flows through an impedance connected to the output port in the direction from terminal 12*a* to terminal 12*b*.

The circuit of FIG. 5 is arranged to correspond to the block diagram of FIG. 4. The same numerals are used for the two ports. If an imaginary line is drawn between terminals 10*a*, 12*a*, the circuitry above the line corresponds to converter 16 in FIG. 4 and the circuitry below the line corresponds to converter 14 in FIG. 4. The output terminal of the uppermost voltage-to-current converter is coupled to gyrator terminal 10*a* and to the input terminal of the lower voltage-to-current converter. The input terminal of the uppermost voltage-to-current converter is coupled to gyrator terminal 12*a* and to the output terminal of the lower voltage-to-current converter.

Transistors T1, T2, are connected in a difference amplifier configuration identical to that shown in FIG. 1, where resistors 24 and 26 are equivalent to the two resistors RE. In the collector circuit of transistor T2, there is provided a constant current source consisting of PNP transistor T10. The voltage at the base of transistor T10 is maintained at a constant value by transistor T9. This latter transistor has its collector and base terminals interconnected and simply serves as a diode as is known in the art. The current flowing through resistors 28, 30 and transistor T9 is determined by the magnitude of source +V. The emitter of transistor T9 is held at a fixed potential as is the base of transistor T10. Since the emitter-base drop across transistor T10 is independent of the emitter-collector drop, it is apparent that the current flowing through resistor 32 and transistor T10 is determined solely by the emitter potential of the transistor and the magnitude of the resistor. Consequently, the current (IS) flowing from the collector of transistor T10 is constant independent of any voltage changes at the collector of transistor T2.

The two emitter resistances 24, 26 are connected to the collector of transistor T11. This transistor, with its emitter resistance 34, is also a constant current source (IO) for the same reason that transistor T10 is a constant current source. The base voltage of transistor T11 is held at a fixed potential. Transistors T7 and T8 are both connected in diode configurations and the current flow through these two transistors and resistors 36, 38 is determined by the magnitude of potential source −V. (It is also possible to use only a single one of transistors T7, T8 and a different valued resistance for one or both of resistors 36, 28. For that matter, any of many well-known constant current sources can be used for both of sources IS and IO.)

The input at the base of transistor T2 is not connected to terminal 12*a*. Instead, terminal 12 is connected to the base of transistor T3, the emitter of this transistor being connected to the base of transistor T2. Transistors T2, T3 thus form a Darlington circuit, the former transistor serving as part of both the difference amplifier and the Darlington circuit. The use of such a Darlingon circuit is well known in the art for increasing the input impedance seen by terminal 12*a*. Transistor T5, connected as a diode, and resistor 20 improve the temperature stability and frequency response of the Darlington circuit. A complete description of the function of the additional transistor and resistor in the Darlington circuit is set forth in my copending application Ser. No. 839,036.

To preserve the symmetry of the circuit, a Darlington circuit consisting of transistors T1 and T4 is also provided at the other input to the difference amplifier. Transistor T6 and resistor 22 are comparable to transistor T5 and resistor 20. In my copending application, only a single transistor is provided rather than both of transistors T5 and T6; each of the resistors comparable to resistors 20 and 22 in the circuit of FIG. 5 are connected to the collector of this single transistor. In the circuit of FIG. 5, however, two separate transistors T5, T6 are required. In the circuit disclosed in my copending application, the emitter of the single transistor comparable to transistors T5, T6 is connected to the junction of the transistors comparable to transistors T1 and T2. However, there are no emitter resistances in the circuit disclosed in my copending application and it is for this reason that a single transistor can be provided in lieu of two separate transistors T5, T6. With emitter degeneration, it is necessary to couple the emitters of the two transistors in each Darlington pair through a separate resistance and diode.

In the upper voltage-to-current converter of FIG. 5, the base of transistor T1 is grounded (through the base-emitter junction of transistor T4). The input voltage at terminal 12*a* is coupled through the base-emitter junction of transistor T3 to the base of transistor T2, and the collector T3 to the base of transistor T2, and the collector of transistor T2 is coupled to whatever circuit (load) is placed across terminals 10*a*, 10*b*. Consequently, the upper voltage-to-current converter is equivalent to that shown in FIG. 1 where terminal VB1 is grounded and the input voltage is applied to terminal VB2. As described above with reference to FIG. 1, any change in input voltage (at terminal 12*a*) is accompanied by a change in output current (through terminals 10*a*, 10*b*) which results in a voltage change of the opposite polarity. It is for this reason that the upper voltage-to-current converter in FIG. 5 corresponds to converter 16 in FIG. 4 which is shown having a 180° phase shift.

The lower voltage-to-current converter in FIG. 5 is for the most part identical to the upper one, and for this reason the various circuits elements are shown with the same numerals followed by prime symbols. For example, transistor T11′ serves the same function as transistor T11–a constant current source. The main difference between the two converters is that the base of transistor T2′ is grounded (through the base-emitter junction of transistor T3′) and the voltage at terminal 10*a* is applied to the base of transistor T1′ (through the base-emitter junction of transistor T4′), rather than the reverse. The output of the difference amplifier (transistors T1′, T2′) is once again at the collector of transistor T2′. As described above with the reference to FIG. 1, if terminal VB2 is grounded and the input voltage is applied to terminal VB1, changes in the output current IL will produce voltage changes in phase with changes in the input voltage VB1. Thus the lower voltage-to-current converter in FIG. 5 is comparable to converter 14 in FIG. 4 which is shown as having a 0° phase shift.

The component values are selected such that in the quiescent state of each of terminals 10*a*, 12*a* is at ground potential. This requires that the base of each of transistors T3 and T4′, and the collector of each of transistors T2 and T2′ be at ground potential in the quiescent condition. In this condition, and assuming a 0.6-volt base-emitter drop across each of transistors T1—T4, it is apparent that the emitter of each of transistors T1 and T2 is at approximately −1.2 volts. (Similar remarks apply to transistors T1′—T4′.) The dynamic range of the gyrator of FIG. 5 is limited to approximately 1 volt across either port because with voltages in excess of this value various ones of the different Darlington and difference amplifier transistors become reversed biased. For example, if terminal 12*a* goes excessively positive, since the emitter voltage of transistor T1 and T4 may become reverse biased. The dynamic range can be increased if the emitter resistances in the difference amplifier are increased since reference to FIG. 2 shows that the basic difference amplifier of FIG. 1 operates linearly over a greater input voltage range as the emitter resistances are increased. Increasing the value of the emitter resistances, however, decreases each of the transconductance parameters in the gyrator admittance matrix since each of these parameters is proportional to the reciprocal of the magnitude of the emitter resistances. The gyrator of FIG. 5 does not include the difference amplifier feedback described in my two copending applications and for this reason is limited for use with relatively low-level signals. However, it has the great advantage of requiring only a single-active stage in each voltage-to-current converter and reduced power dissipation requirements.

As described in my copending application Ser. No. 839,036, at times it is desirable to change the curve of the effective Q of a gyrator circuit as a function of frequency by introducing capacitive compensation. A complete description of the problem and its solution are set forth in my earlier application. In the circuit of FIG. 5, capacitor 40 can be connected between the emitters of transistors T1 and T2 for improving the high-frequency performance of the gyrator. (Similarly, the capacitor can be placed across the comparable emitter terminals in the lower voltage-to-current converter.) Capacitor 42 can be used to shift the Q curve toward the lower frequencies. (Similarly, instead of shunting resistors 24′, 26′ by capacitor 42, the two emitter resistances in the upper voltage-to-current converter can be shunted in the same manner.)

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A gyrator having first and second terminals, said gyrator comprising:

a. a first voltage-to-current converter having input and output terminals coupled to the first and second gyrator terminals respectively, said first voltage-to-current converter comprising:

1. a difference amplifier having first and second transistors, the collector electrode of said first transistor being coupled to the output terminal of the first voltage-to-current converter, the emitter electrodes of said transistors being coupled together, the base electrode of said second transistor being coupled to a terminal adapted to connection to a reference potential;
2. a constant current source connected directly to the collector electrode of said first transistor;
3. a third transistor having a base electrode coupled to the input terminal of said voltage-to-current converter, the emitter electrode of said third transistor being coupled to the base electrode of said first transistor, said first and third transistors being arranged in a Darlington circuit configuration;

b. a second voltage-to-current converter oppositely phased from said first voltage-to-current converter and having input and output terminals coupled respectively to the output and input terminals of the first voltage-to-current converter, said second voltage-to-current converter comprising:

1. a difference amplifier having first and second transistors, the collector electrode of said second transistor being coupled to the output terminal of said second voltage-to-current converter, the emitter electrodes of said second transistor being coupled to a terminal adapted for connection to a reference potential;
2. a constant current source connected directly to the collector terminal of the first transistor;
3. a third transistor having a base electrode coupled to the input terminal of said voltage-to-current converter, the emitter electrode of said third transistor being coupled to the base electrode of said first transistor, said second and third transistors being arranged in a Darlington circuit configuration.

2. The gyrator of claim 1 wherein each voltage-to-current converter further comprises means for providing emitter degeneration coupled between the emitter electrodes of said first and second transistors of each difference amplifier.

3. The gyrator of claim 2 wherein said means for providing emitter degeneration comprises a pair of resistors, each having one terminal connected together and a second terminal coupled to the emitter electrodes of the first and second transistors respectively.

4. The gyrator of claim 3 wherein each of said voltage-to-current converters further comprises a series-connected resistor and a unidirectional current flow device coupled between the emitter electrodes of said first and third transistors.

5. The gyrator of claim 4 wherein each of said voltage-to-current converters further comprises a fourth transistor coupled between the base electrode of said second transistor and the terminal adapted for connection to a reference potential, the emitter electrode of said fourth transistor being coupled to the base electrode of said second transistor, the base electrode of said fourth transistor being coupled to the terminal adapted for connection to a reference potential, said third and fourth transistors being coupled together in a Darlington circuit configuration.

6. The gyrator of claim 5 wherein each of said voltage-to-current converters further comprises a series connected resistor and a unidirectional current flow device coupled between the emitter electrode of said second and fourth transistors.

* * * * *